(12) United States Patent
Park et al.

(10) Patent No.: US 9,951,847 B2
(45) Date of Patent: *Apr. 24, 2018

(54) PLANETARY GEAR TRAIN OF AUTOMATIC TRANSMISSION FOR VEHICLE

(71) Applicant: Hyundai Motor Company, Seoul (KR)

(72) Inventors: JongSool Park, Hwaseong-si (KR);
Dong Hwan Hwang, Seoul (KR);
Seong Wook Hwang, Gunpo-si (KR);
Seongwook Ji, Ansan-si (KR); Chang Wook Lee, Suwon-si (KR); Hyun Sik Kwon, Seoul (KR); SeokJin Kim, Hwaseong-si (KR); KyeongHun Lee, Seoul (KR); Wonmin Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 79 days.

This patent is subject to a terminal disclaimer.

(21) Appl. No.: 14/943,399

(22) Filed: Nov. 17, 2015

(65) Prior Publication Data

US 2017/0074362 A1 Mar. 16, 2017

(30) Foreign Application Priority Data

Sep. 14, 2015 (KR) .................. 10-2015-0129854

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
CPC ................ F16H 2200/2012; F16H 2200/2046
See application file for complete search history.

(56) References Cited

U.S. PATENT DOCUMENTS

| 7,896,774 B2 | 3/2011 | Phillips et al. | |
| 8,758,187 B2 * | 6/2014 | Mellet | F16H 3/666 475/280 |

(Continued)

FOREIGN PATENT DOCUMENTS

| JP | 2012-247058 A | 12/2012 |
| JP | 2013-190048 A | 9/2013 |
| KR | 10-2013-0000171 | 1/2013 |

*Primary Examiner* — Sherry L Estremsky
(74) *Attorney, Agent, or Firm* — Morgan, Lewis & Bockius LLP

(57) ABSTRACT

A planetary gear train of an automatic transmission for a vehicle may include an input shaft; an output shaft; a first to fourth planetary gear sets and six control elements disposed at portions selectively connecting between the rotation elements or disposed at portions selectively connecting between the rotation elements and a transmission housing, wherein the input shaft is continuously connected to the second rotation element, the output shaft is continuously connected to the eleventh rotation element, the first rotation element is continuously connected to the fourth rotation element, the fifth rotation element is continuously connected to the eighth rotation element, the sixth rotation element is continuously connected to the eleventh rotation element, the ninth rotation element is continuously connected to the tenth rotation element, the ninth rotation element is selectively connected to the transmission housing, and the six control elements are selectively operated in combination of three of the six control elements.

9 Claims, 2 Drawing Sheets

(56) References Cited

U.S. PATENT DOCUMENTS

| | | | |
|---|---|---|---|
| 8,777,797 B2* | 7/2014 | Mellet | F16H 3/66 475/275 |
| 8,926,469 B2* | 1/2015 | Hart | F16H 3/66 475/276 |
| 9,091,329 B2* | 7/2015 | Otanez | F16H 3/66 |
| 9,353,833 B2* | 5/2016 | Beck | F16H 3/66 |
| 9,625,010 B2* | 4/2017 | Kwon | F16H 3/66 |
| 2017/0074363 A1* | 3/2017 | Park | F16H 3/66 |
| 2017/0074370 A1* | 3/2017 | Kwon | F16H 3/66 |

* cited by examiner

FIG. 2

| SHIFT STAGE | CONTROL ELEMENT ||||||  GEAR RATIO | INTER-STAGE RATIO | SPAN OF GEAR RATIO |
|---|---|---|---|---|---|---|---|---|---|
| | B1 | B1 | C1 | C2 | C3 | C4 | | | |
| D1 | ● | | ● | ● | | | 4.558 | - | |
| D2 | ● | | | ● | ● | | 2.729 | 1.670 | |
| D3 | ● | | | | ● | ● | 1.759 | 1.551 | |
| D4 | ● | | ● | | | ● | 1.325 | 1.328 | 8.9 (TUNABLE) |
| D5 | | | ● | ● | | ● | 1.000 | 1.325 | |
| D6 | | ● | ● | | | ● | 0.819 | 1.221 | |
| D7 | | ● | | | ● | ● | 0.693 | 1.182 | |
| D8 | | ● | | ● | | ● | 0.590 | 1.175 | |
| D9 | | ● | | ● | ● | | 0.514 | 1.148 | |
| REV | ● | ● | ● | | | | -3.810 | - | - |

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2015-0129854 filed on Sep. 14, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle capable of improving power delivery performance and fuel efficiency and securing linearity of an inter-stage ratio of shift stages by increasing a span of a gear ratio while implementing advance 9-speed by components as small as possible.

Description of Related Art

A recent rise in oil prices has become a factor entering unlimited competition toward improvement of fuel efficiency.

Therefore, research into a technology capable of decreasing a weight and improving fuel efficiency through downsizing of an engine has been conducted, and research into a technology capable of securing drivability and fuel efficiency competitiveness through multi-staging of an automatic transmission has been conducted.

However, as the number of shift stages in the automatic transmission is increased, the number of internal components is increased, such that mountability, a production cost, a weight, transfer efficiency, and the like, may be deteriorated.

Therefore, it may be important to develop a planetary gear train capable of generating maximum efficiency with a small number of components in order to increase a fuel efficiency improvement effect through the multi-staging.

In terms of this, recently, an 8-speed automatic transmission has been implemented, and research into and development of the planetary gear train capable of implementing shift stages of 8-speed or more have been actively conducted.

However, recently, in the case of the 8-speed automatic transmission, since a span of a gear ratio is maintained at a level of 6.5 to 7.5, there is a problem that a fuel efficiency improvement effect is not large.

In addition, in the case in which a span of a gear ratio of the 8-speed automatic transmission is 9.0 or more, linearity of an inter-stage ratio of shift stages may not be secured, such that operation efficiency of the engine and drivability of a vehicle are deteriorated. Therefore, the development of a high-efficiency automatic transmission of 9-speed or more has been demanded.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle capable of improving power delivery performance and fuel efficiency and securing linearity of an inter-stage ratio of shift stages by increasing a span of a gear ratio while implementing at least advance 9-speed or more shift stages and at least reverse 1-speed or more shift stages by components as small as possible.

An exemplary embodiment of the present invention provides a planetary gear train of an automatic transmission for a vehicle including: an input shaft receiving power of an engine; an output shaft outputting shifted power; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; and six control elements disposed at portions selectively connecting between the rotation elements or disposed at portions selectively connecting between the rotation elements and a transmission housing, wherein the input shaft is continuously connected to the second rotation element, the output shaft is continuously connected to the eleventh rotation element, the first rotation element is continuously connected to the fourth rotation element, the fifth rotation element is continuously connected to the eighth rotation element, the sixth rotation element is continuously connected to the eleventh rotation element, the ninth rotation element is continuously connected to the tenth rotation element, the ninth rotation element is selectively connected to the transmission housing, and three of the six control elements are operated to implement at least advance 9-speed shift stages and at least one reverse shift stage.

The seventh rotation element may be selectively connected to the transmission housing, the first rotation element may be selectively connected to the third rotation element, the first rotation element may be selectively connected to the seventh rotation element, the fifth rotation element may be selectively connected to the third rotation element, and the third rotation element may be selectively connected to the twelfth rotation element.

The first, second, and third rotation elements of the first planetary gear set may be a sun gear, a planetary carrier, and a ring gear, respectively, the fourth, fifth, and sixth rotation elements of the second planetary gear set may be a sun gear, a planetary carrier, and a ring gear, respectively, the seventh, eighth, and ninth rotation elements of the third planetary gear set may be a sun gear, a planetary carrier, and a ring gear, respectively, and the tenth, eleventh, and twelfth rotation elements of the fourth planetary gear set may be a sun gear, a planetary carrier, and a ring gear, respectively.

In the planetary gear train according to an exemplary embodiment of the present invention, at least advance 9-speed shift stages and at least reverse 1-speed or more shift stages may be implemented by combining four planetary gear sets formed of simple planetary gear sets with each other using six control elements.

In addition, in the planetary gear train according to an exemplary embodiment of the present invention, since a span of a gear ratio close to 9.0 may be secured, operation efficiency of an engine may be maximized.

Further, in the planetary gear train according to an exemplary embodiment of the present invention, since linearity of an inter-stage ratio of shift stages may be secured through high efficiency multi-staging, drivability such as acceleration before and after a shift, an engine speed rhythmic sense, and the like, may be improved.

Other effects that may be obtained or predicted by an exemplary embodiment of the present invention will be disclosed explicitly or implicitly in a detailed description for an exemplary embodiment of the present invention. That is, various effects predicted according to an exemplary embodiment of the present invention will be disclosed in a detailed description to be provided below.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table of each shift stage of each control element used in the planetary gear train according to an exemplary embodiment of the present invention.

Figure 1:
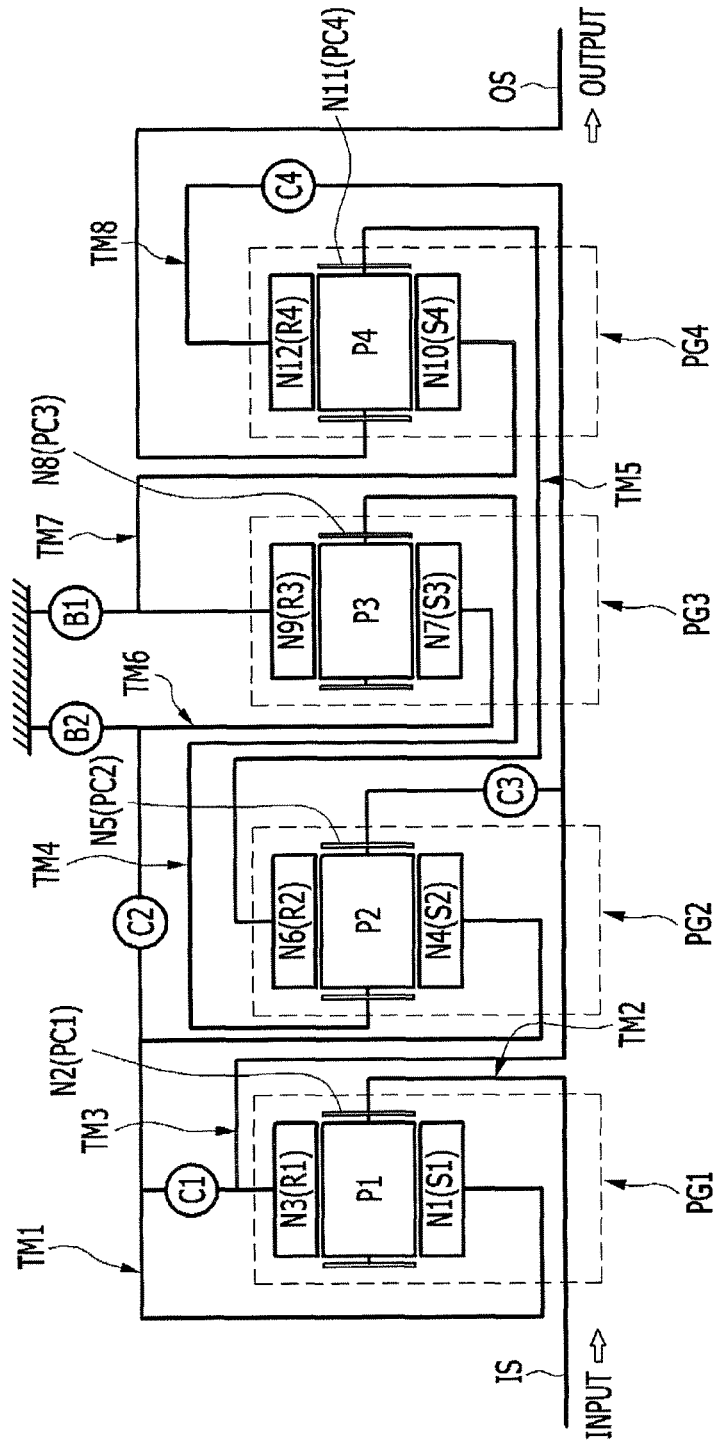
FIG. 1 is a schematic view of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described more fully with reference to the accompanying drawings so as to be easily practiced by those skilled in the art to which the present invention pertains. As those skilled in the art would realize, the described embodiments may be modified in various different ways, all without departing from the spirit or scope of the present invention.

Portions unrelated to the description will be omitted in order to obviously describe the present invention, and similar components will be denoted by the same reference numerals throughout the present specification.

In addition, in the following description, terms 'first', 'second', and the like, will be used to distinguish components having the same names from each other, and will not be necessarily be limited to a sequence thereof.

FIG. 1 is a schematic view of a planetary gear train according to an exemplary embodiment of the present invention.

Referring to FIG. 1, the planetary gear train according to an exemplary embodiment of the present invention is configured to include first, second, third, and fourth planetary gear sets PG1, PG2, PG3, and PG4 disposed on the same axis, an input shaft IS, an output shaft OS, eight shafts TM1 to TM8 directly connecting the respective rotation elements of the first, second, third, and fourth planetary gear sets PG1, PG2, PG3, and PG4 to each other, six control elements C1 to C4 and B1 and B2, and a transmission housing H.

In addition, rotation power input from the input shaft IS is shifted by mutual complementing operation between the first, second, third, and fourth planetary gear sets PG1, PG2, PG3, and PG4 and is then output through the output shaft OS.

The respective simple planetary gear sets are disposed in a sequence of the first, second, third, and fourth planetary gear sets PG1, PG2, PG3, and PG4 from an engine side.

The input shaft IS is an input member, and rotation power from a crack shaft of an engine is input to the input shaft after a torque thereof is converted through a torque converter.

The output shaft OS, which is an output member, is disposed on the same axis as an axis on which the input shaft IS is disposed and transfers shifted driving force to a driving shaft through a differential apparatus.

The first planetary gear set PG1, which is a single pinion planetary gear set, includes a first sun gear S1, which is a first rotation element N1, a first planetary carrier PC1, which is a second rotation element N2, supporting a first pinion P1 externally engaged with the first sun gear S1, which is the first rotation element N1, and a first ring gear R1, which is a third rotation element N3, internally engaged with the first pinion P1, as rotation elements.

The second planetary gear set PG2, which is a single pinion planetary gear set, includes a second sun gear S2, which is a fourth rotation element N4, a second planetary carrier PC2, which is a fifth rotation element N5, supporting a second pinion P2 externally engaged with the second sun gear S2, which is the fourth rotation element N4, and a second ring gear R2, which is a sixth rotation element N6, internally engaged with the second pinion P2.

The third planetary gear set PG3, which is a single pinion planetary gear set, includes a third sun gear S3, which is a seventh rotation element N7, a third planetary carrier PC3, which is an eighth rotation element N8, supporting a third pinion P3 externally engaged with the third sun gear S3, which is the seventh rotation element N7, and a third ring gear R3, which is a ninth rotation element N9, internally engaged with the third pinion P3.

The fourth planetary gear set PG4, which is a single pinion planetary gear set, includes a fourth sun gear S4, which is a tenth rotation element N10, a fourth planetary carrier PC4, which is an eleventh rotation element N11, supporting a fourth pinion P4 externally engaged with the fourth sun gear S4, which is the tenth rotation element N10, and a fourth ring gear R4, which is a twelfth rotation element N12, internally engaged with the fourth pinion P4.

In the first, second, third, and fourth planetary gear sets PG1, PG2, PG3, and PG4, the first rotation element N1 is directly connected to the fourth rotation element N4, the fifth rotation element N5 is directly connected to the eighth rotation element N8, the sixth rotation element N6 is directly connected to the eleventh rotation element N11, and the ninth rotation element N9 is directly connected to the tenth rotation element N10, such that the first, second, third, and fourth planetary gear sets PG1, PG2, PG3, and PG4 are operated while having a total of eight shafts TM1 to TM7.

Configurations of the eight shafts TM1 to TM8 will be described below.

The first shaft TM1 is configured to include the first rotation element N1 {first sun gear S1} and the fourth rotation element N4 {second sun gear S2}.

The second shaft TM2 is configured to include the second rotation element N2 {first planetary carrier PC1}, and is directly connected to the input shaft IS to thereby be continuously operated as an input element.

The third shaft TM3 is configured to include the third rotation element N3 {first ring gear R1}.

The fourth shaft TM4 is configured to include the fifth rotation element N5 {second planetary carrier PC2} and the eighth rotation element N8 {third planetary carrier PC3}, and is selectively connected to the third shaft TM3.

The fifth shaft TM5 is configured to include the sixth rotation element N6 {second ring gear R2} and the eleventh rotation element N11 {fourth planetary carrier PC4}, and is directly connected to the output shaft OS to thereby be continuously operated as an output element.

The sixth shaft TM6 is configured to include the seventh rotation element N7 {third sun gear S3}, and is selectively connected to the transmission housing H while being selectively connected to the first shaft TM1.

The seventh shaft TM7 is configured to include the ninth rotation element N9 {third ring gear R3} and the tenth rotation element N10 {fourth sun gear S4}, and is selectively connected to the transmission housing H.

The eight shaft TM8 is configured to include the twelfth rotation element N12 {fourth ring gear R4}, and is selectively connected to the third shaft TM3.

Four clutches C1 to C4, which are control elements, are disposed at portions of shafts selectively connected to each other among the shafts TM1 to TM8.

In addition, two brakes B1 and B2, which are control elements, are disposed at portions of shafts selectively connected to the transmission housing H among the shafts TM1 to TM8.

Positions of the six control elements C1 to C4 and B1 and B2 will be described below.

The first clutch C1 is disposed between the first shaft TM1 and the third shaft TM3 to selectively connect the first shaft TM1 and the third shaft TM3 to each other.

The second clutch C2 is disposed between the first shaft TM1 and the sixth shaft TM6 to selectively connect the first shaft TM1 and the sixth shaft TM6 to each other.

The third clutch C3 is interposed between the third shaft TM3 and the fourth shaft TM4 to selectively connect the third shaft TM3 and the fourth shaft TM4 to each other.

The fourth clutch C4 is interposed between the third shaft TM3 and the eight shaft TM8 to selectively connect the third shaft TM3 and the eight shaft TM8 to each other.

The first brake B1 is interposed between the seventh shaft TM7 and the transmission housing H to allow the seventh shaft TM7 to be operated as a selective fixed element.

The second brake B2 is interposed between the sixth shaft TM6 and the transmission housing H to allow the sixth shaft TM6 to be operated as a selective fixed element.

The respective control elements including the first, second, third, and fourth clutches C1, C2, C3, and C4 and the first and second brakes B1 and B2 may be formed of multi-plate type hydraulic pressure friction-coupled units friction-coupled to each other by hydraulic pressure.

FIG. 2 is an operation table of each shift stage of each control element used in the planetary gear train according to an exemplary embodiment of the present invention.

As shown in FIG. 2, in the planetary gear train according to an exemplary embodiment of the present invention, a shift is performed while three control elements being operated in each shift stage.

In an advance 1-speed shift stage D1, the first and second clutches C1 and C2 and the first brake B1 are simultaneously operated. Therefore, an input is made to the second shaft TM2 in a state in which the first shaft TM1 is connected to the third shaft TM3 and the sixth shaft TM6 by the operation of the first and second clutches C1 and C2, and the seventh shaft T7 is operated as a fixed element by the operation of the first brake B1, such that a shift to an advance 1-speed is made and an output is made through the fifth shaft TM5.

In an advance 2-speed shift stage D2, the second and third clutches C2 and C3 and the first brake B1 are simultaneously operated. Therefore, an input is made to the second shaft TM2 in a state in which the first shaft TM1 is connected to the sixth shaft TM6 by the operation of the second clutch C2 and the third shaft TM3 is connected to the fourth shaft TM4 by the operation of the third clutch C3, and the seventh shaft TM7 is operated as a fixed element by the operation of the first brake B1, such that a shift to an advance 2-speed is made and an output is made through the fifth shaft TM5.

In an advance 3-speed shift stage D3, the third and fourth clutches C3 and C4 and the first brake B1 are simultaneously operated. Therefore, an input is made to the second shaft TM2 in a state in which the third shaft TM3 is connected to the fourth shaft TM4 and the eight shaft TM8 by the operation of the third and fourth clutches C3 and C4, and the seventh shaft T7 is operated as a fixed element by the operation of the first brake B1, such that a shift to an advance 3-speed is made and an output is made through the fifth shaft TM5.

In an advance 4-speed shift stage D4, the first and fourth clutches C1 and C4 and the first brake B1 are simultaneously operated. Therefore, an input is made to the second shaft TM2 in a state in which the first shaft TM1 is connected to the third shaft TM3 by the operation of the first clutch C1 and the third shaft TM3 is connected to the eight shaft TM8 by the operation of the fourth clutch C4, and the seventh shaft TM7 is operated as a fixed element by the operation of the first brake B1, such that a shift to an advance 4-speed is made and an output is made through the fifth shaft TM5.

In an advance 5-speed shift stage 5D, the first, second, and fourth clutches C1, C2, and C4 are simultaneously operated. Therefore, the first shaft TM1 is connected to the third shaft TM3 and the sixth shaft TM6 by the operation of the first and second clutches C1 and C2 and the third shaft TM3 is connected to the eighth shaft TM8 by the operation of the fourth clutch C4, such that the first, second, third, and fourth planetary gear sets PG1, PG2, PG3, and PG4 are in a state in which they are directly connected to each other. As a result, a shift to an advance 5-speed in which an input is output as it is made and an output is made through the fifth shaft TM5.

In an advance 6-speed shift stage D6, the first and fourth clutches C1 and C4 and the second brake B2 are simultaneously operated. Therefore, an input is made through the second shaft TM2 in a state in which the first shaft TM1 is connected to the third shaft TM3 by the operation of the first clutch C1 and the third shaft TM3 is connected to the eight shaft TM8 by the operation of the fourth clutch C4, and the sixth shaft TM2 is operated as a fixed element by the operation of the second brake B2, such that a shift to an advance 6-speed is made and an output is made through the fifth shaft TM5.

In an advance 7-speed shift stage D7, the third and fourth clutches C3 and C4 and the second brake B2 are simultaneously operated. Therefore, an input is made to the second shaft TM2 in a state in which the third shaft TM3 is connected to the fourth shaft TM4 and the eight shaft TM8 by the operation of the third and fourth clutches C3 and C4, and the sixth shaft T6 is operated as a fixed element by the operation of the second brake B2, such that a shift to an advance 7-speed is made and an output is made through the fifth shaft TM5.

In an advance 8-speed shift stage D8, the second and fourth clutches C2 and C4 and the second brake B2 are simultaneously operated. Therefore, an input is made to the second shaft TM2 in a state in which the first shaft TM1 is connected to the sixth shaft TM6 by the operation of the second clutch C2 and the third shaft TM3 is connected to the eighth shaft TM8 by the operation of the fourth clutch C4, and the sixth shaft TM6 is operated as a fixed element by the operation of the second brake B2, such that a shift to an advance 8-speed is made and an output is made through the fifth shaft TM5.

In an advance 9-speed shift stage D9, the second and third clutches C2 and C3 and the second brake B2 are simultaneously operated. Therefore, an input is made to the second shaft TM2 in a state in which the first shaft TM1 is connected to the sixth shaft TM6 by the operation of the second clutch C2 and the third shaft TM3 is connected to the fourth shaft TM4 by the operation of the third clutch C3, and the sixth shaft TM6 is operated as a fixed element by the operation of the second brake B2, such that a shift to an advance 9-speed is made and an output is made through the fifth shaft TM5.

In a reverse shift stage REV, the first clutch C1 and the first and second brakes B1 and B2 are simultaneously operated. Therefore, an input is made to the second shaft TM2 in a state in which the first shaft TM1 is connected to the third shaft TM3 by the operation of the first clutch C1, and the seventh shaft TM7 is operated as a fixed element by the operation of the first brake B1 and the sixth shaft TM6 is operated as a fixed element by the operation of the second brake B2, such that a reverse shift is made and a reverse rotation output is made through the fifth shaft TM5.

As described above, the planetary gear train according to an exemplary embodiment of the present invention may realize at least advance 9-speed shift stages and at least reverse 1-speed or more shift stages through the four planetary gear sets PG1, PG2, PG3, and PG4 by controlling the operations of the four clutches C1, C2, C3, and C4 and the two brakes B1 and B2.

In addition, inter-stage ratios of advance shift stages are 1.2 or more or are close to 1.2 to secure linearity, thereby making it possible to improve drivability such as acceleration before and after a shift, an engine speed rhythmic sense, and the like.

In addition, a span of a gear ratio is close to 9.0, such that operation efficiency of the engine may be maximized.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft receiving power of an engine;
    an output shaft outputting shifted power;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element; and
    six control elements disposed at portions selectively connecting between the rotation elements or disposed at portions selectively connecting between the rotation elements and a transmission housing,
    wherein the input shaft is continuously connected to the second rotation element,
    the output shaft is continuously connected to the eleventh rotation element,
    the first rotation element is continuously connected to the fourth rotation element,
    the fifth rotation element is continuously connected to the eighth rotation element,
    the sixth rotation element is continuously connected to the eleventh rotation element,
    the ninth rotation element is continuously connected to the tenth rotation element,
    the ninth rotation element is selectively connected to the transmission housing, and
    the six control elements are selectively operated in combination of three of the six control elements to implement at least 9 advance speed shift stages and at least one reverse shift stage,
    wherein the seventh rotation element is selectively connected to the transmission housing,
    wherein the first rotation element is selectively connected to the third rotation element,
    wherein the first rotation element is selectively connected to the seventh rotation element,
    wherein the fifth rotation element is selectively connected to the third rotation element, and
    wherein the third rotation element is selectively connected to the twelfth rotation element.

2. The planetary gear train of an automatic transmission for a vehicle of claim 1, wherein
    the first rotation element, the second rotation element, and the third rotation element of the first planetary gear set are a sun gear, a planetary carrier, and a ring gear, respectively,
    the fourth rotation element, the fifth rotation element, and the sixth rotation element of the second planetary gear set are a sun gear, a planetary carrier, and a ring gear, respectively, the seventh rotation element, the eighth rotation element, and the ninth rotation element of the third planetary gear set are a sun gear, a planetary carrier, and a ring gear, respectively, and the tenth, eleventh, and twelfth rotation elements of the fourth planetary gear set are a sun gear, a planetary carrier, and a ring gear, respectively.

3. A planetary gear train of an automatic transmission for a vehicle, comprising:
   an input shaft receiving power of an engine;
   an output shaft outputting shifted power;
   a first planetary gear set including a first rotation element, a second rotation element, and a third rotation element;
   a second planetary gear set including a fourth rotation element, a fifth rotation element, and a sixth rotation element;
   a third planetary gear set including a seventh rotation element, an eighth rotation element, and a ninth rotation element;
   a fourth planetary gear set including tenth, eleventh, and twelfth rotation elements;
   six control elements disposed at portions selectively connecting between the rotation elements or disposed at portions selectively connecting between the rotation elements and a transmission housing;
   a first shaft including the first rotation element and the fourth rotation element;
   a second shaft including the second rotation element and directly connected to the input shaft;
   a third shaft including the third rotation element and selectively connected to the first shaft;
   a fourth shaft including the fifth rotation element and the eighth rotation element and selectively connected to the third shaft;
   a fifth shaft including the sixth rotation element and the eleventh rotation element and directly connected to the output shaft;
   a sixth shaft including the seventh rotation element and selectively connected to the first shaft and the transmission housing;
   a seventh shaft including the ninth rotation element and the tenth rotation element and selectively connected to the transmission housing; and
   an eighth shaft including the twelfth rotation element and selectively connected to the third shaft.

4. The planetary gear train of an automatic transmission for a vehicle of claim 3, wherein
   in the first planetary gear set, which is a single pinion planetary gear set, the first rotation element is a first sun gear, the second rotation element is a first planetary carrier, and the third rotation element is a first ring gear,
   in the second planetary gear set, which is a single pinion planetary gear set, the fourth rotation element is a second sun gear, the fifth rotation element is a second planetary carrier, and the sixth rotation element is a second ring gear,
   in the third planetary gear set, which is a single pinion planetary gear set, the seventh rotation element is a third sun gear, the eighth rotation element is a third planetary carrier, and the ninth rotation element is a third ring gear, and
   in the fourth planetary gear set, which is a single pinion planetary gear set, the tenth rotation element is a fourth sun gear, the eleventh rotation element is a fourth planetary carrier, and the twelfth rotation element is a fourth ring gear.

5. The planetary gear train of an automatic transmission for a vehicle of claim 3, wherein
   the six control elements include:
   a first clutch selectively connecting the first shaft and the third shaft to each other;
   a second clutch selectively connecting the first shaft and the sixth shaft to each other;
   a third clutch selectively connecting the third shaft and the fourth shaft to each other;
   a fourth clutch selectively connecting the third shaft and the eighth shaft to each other;
   a first brake selectively connecting the seventh shaft and the transmission housing to each other; and
   a second brake selectively connecting the sixth shaft and the transmission housing to each other.

6. The planetary gear train of an automatic transmission for a vehicle of claim 5, wherein
   shift stages implemented by selective operations of the six control elements include:
   an advance first shift stage implemented by simultaneous operations of the first and second clutches and the first brake;
   an advance second shift stage implemented by simultaneous operations of the second and third clutches and the first brake;
   an advance third shift stage implemented by simultaneous operations of the third and fourth clutches and the first brake; and
   an advance fourth shift stage implemented by simultaneous operations of the first and fourth clutches and the first brake;
   an advance fifth shift stage implemented by simultaneous operations of the first, second, and fourth clutches;
   an advance sixth shift stage implemented by simultaneous operations of the first and fourth clutches and the second brake;
   an advance seventh shift stage implemented by simultaneous operations of the third and fourth clutches and the second brake;
   an advance eighth shift stage implemented by simultaneous operations of the second and fourth clutches and the second brake;
   an advance ninth shift stage implemented by simultaneous operations of the second and third clutches and the second brake; and
   a reverse shift stage implemented by simultaneous operations of the first clutch and the first and second brakes.

7. A planetary gear train of an automatic transmission for a vehicle, comprising:
   an input shaft receiving power of an engine;
   an output shaft outputting shifted power;
   a first planetary gear set formed of a single pinion planetary gear set and including a first rotation element, a second rotation element, and a third rotation element;
   a second planetary gear set formed of a single pinion planetary gear set and including a fourth rotation element, a fifth rotation element, and a sixth rotation element;
   a third planetary gear set formed of a single pinion planetary gear set and including a seventh rotation element, an eighth rotation element, and a ninth rotation element;
   a fourth planetary gear set formed of a single pinion planetary gear set and including tenth, eleventh, and twelfth rotation elements;
   a first shaft including the first rotation element and the fourth rotation element;

a second shaft including the second rotation element and directly connected to the input shaft;

a third shaft including the third rotation element and selectively connected to the first shaft;

a fourth shaft including the fifth rotation element and the eighth rotation element and selectively connected to the third shaft;

a fifth shaft including the sixth rotation element and the eleventh rotation element and directly connected to the output shaft;

a sixth shaft including the seventh rotation element and selectively connected to the first shaft and a transmission housing;

a seventh shaft including the ninth rotation element and the tenth rotation element and selectively connected to the transmission housing;

an eight shaft including the twelfth rotation element and selectively connected to the third shaft;

a first clutch selectively connecting the first shaft and the third shaft to each other;

a second clutch selectively connecting the first shaft and the sixth shaft to each other;

a third clutch selectively connecting the third shaft and the fourth shaft to each other;

a fourth clutch selectively connecting the third shaft and the eighth shaft to each other;

a first brake selectively connecting the seventh shaft and the transmission housing to each other; and a second brake selectively connecting the sixth shaft and the transmission housing to each other.

8. The planetary gear train of an automatic transmission for a vehicle of claim 7, wherein in the first planetary gear set, the first rotation element is a first sun gear, the second rotation element is a first planetary carrier, and the third rotation element is a first ring gear, in the second planetary gear set, the fourth rotation element is a second sun gear, the fifth rotation element is a second planetary carrier, and the sixth rotation element is a second ring gear, in the third planetary gear set, the seventh rotation element is a third sun gear, the eighth rotation element is a third planetary carrier, and the ninth rotation element is a third ring gear, and in the fourth planetary gear set, the tenth rotation element is a fourth sun gear, the eleventh rotation element is a fourth planetary carrier, and the twelfth rotation element is a fourth ring gear.

9. The planetary gear train of an automatic transmission for a vehicle of claim 7, wherein shift stages implemented by selective operations of the four clutches and the two brakes include:

an advance first shift stage implemented by simultaneous operations of the first and second clutches and the first brake;

an advance second shift stage implemented by simultaneous operations of the second and third clutches and the first brake;

an advance third shift stage implemented by simultaneous operations of the third and fourth clutches and the first brake;

an advance fourth shift stage implemented by simultaneous operations of the first and fourth clutches and the first brake;

an advance fifth shift stage implemented by simultaneous operations of the first, second, and fourth clutches;

an advance sixth shift stage implemented by simultaneous operations of the first and fourth clutches and the second brake;

an advance seventh shift stage implemented by simultaneous operations of the third and fourth clutches and the second brake;

an advance eighth shift stage implemented by simultaneous operations of the second and fourth clutches and the second brake;

an advance ninth shift stage implemented by simultaneous operations of the second and third clutches and the second brake; and a reverse shift stage implemented by simultaneous operations of the first clutch and the first and second brakes.

* * * * *